(12) United States Patent
Weis

(10) Patent No.: US 6,279,883 B1
(45) Date of Patent: Aug. 28, 2001

(54) BEARING MODULE FOR AN ACTUATING ELEMENT

(75) Inventor: Christian Weis, Mainz (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/416,791

(22) Filed: Oct. 13, 1999

(30) Foreign Application Priority Data

Oct. 19, 1998 (DE) .............................................. 198 48 093

(51) Int. Cl.⁷ .................. B60G 11/02; F16F 1/18
(52) U.S. Cl. .................. 267/36.1; 74/513; 74/560
(58) Field of Search .................. 267/36.1, 154, 267/208, 210, 214, 215, 216; 74/512, 513, 560, 514

(56) References Cited

U.S. PATENT DOCUMENTS

| | | | | |
|---|---|---|---|---|
| 5,408,899 | * | 4/1995 | Stewart | 74/513 |
| 5,529,296 | * | 6/1996 | Kato et al. | 267/155 |
| 5,934,152 | * | 8/1999 | Aschoff et el. | 74/513 |
| 6,003,404 | * | 12/1999 | Hannewald | 74/512 |

FOREIGN PATENT DOCUMENTS

| | | |
|---|---|---|
| 8915641 | 12/1990 | (DE) . |
| 4300096 | 7/1994 | (DE) . |
| 4426549 | 2/1996 | (DE) . |
| 19517172 | 11/1996 | (DE) . |
| 19536699 | 4/1997 | (DE) . |
| 19737289 | 3/1999 | (DE) . |

* cited by examiner

Primary Examiner—Robert J. Oberleitner
Assistant Examiner—Pamela M. Rodriguez
(74) Attorney, Agent, or Firm—Martin A. Farber

(57) ABSTRACT

The bearing module (10) is used to support an actuating element which can be displaced counter to the force of at least one return spring (32) with a force hysteresis due to friction. With previous bearing modules, complex friction mechanisms which ensure the desired hysteresis are provided in addition to the return springs. To reduce the number of parts necessary for a bearing module, the proposal is that the force should be transmitted from the return spring (32) via a friction element (24) which slides on a friction surface (28) assigned to the return spring (32) during the displacement, either tensioning the spring (32) or being returned by it. The direct production of hysteresis in the return mechanism reduces the number of components and hence the costs of production for the bearing module (10).

15 Claims, 2 Drawing Sheets

BEARING MODULE FOR AN ACTUATING ELEMENT

FIELD AND BACKGROUND OF THE INVENTION

The invention relates to a bearing module for an actuating element which can be displaced counter to the force of at least one return spring, a force hysteresis produced by friction arising when the actuating element is actuated.

Modules of this kind are used, for example, with motor-vehicle accelerator pedals, the position of which is detected by an electronic sensor, the data from which are transmitted electronically to the engine control system. Here, the module produces a force hysteresis which, as the accelerator pedal is actuated, produces an actuating characteristic based on cable transmission systems, a characteristic to which car drivers are used to and which has proven itself on grounds of comfort.

The previously known modules, such as those from DE 195 17 172 A1 and from Patent Application DE 197 37 289.9, require a large number of components and are accordingly expensive to produce and assemble.

SUMMARY OF THE INVENTION

It is the object of the invention to produce a module for actuating elements which can produce the desired force hysteresis with a reduced number of components.

According to the invention, the object is achieved by virtue of the fact that force is transmitted between the return spring and the actuating element via a friction element which slides on a friction surface assigned to the free end of the return spring as the actuating element is displaced, the return spring either being tensioned by it as a function of the direction of displacement or being returnable by the restoring force of the return spring.

The solution according to the invention thus produces the desired force hysteresis directly in the return mechanism of the return spring without the need for additional supported components such as rockers, which are expensive and prone to faults. At the same time, integrating the production of friction into the return mechanism reduces the number of components necessary and leads to a module which is of simpler construction and is cheaper to produce.

In a preferred embodiment of the invention, two return springs are arranged in a redundant manner. On the one hand, doubling the number of return springs makes possible a higher restoring force, allowing the pedal resistance to be varied within a wide range. If one of the return springs breaks, it is also possible for the second to provide return properties that are still adequate and hence, although the car driver detects the breakage of one return spring from the reduced pedal resistance, he can still drive to the nearest garage without problems. Sticking of the accelerator pedal is reliably avoided.

In a further preferred embodiment of the invention, the return springs are leaf springs which are clamped at one end and the flanks of which form the friction surfaces at their free ends.

Leaf springs allow a particularly simple module design since, on the one hand, they can be clamped easily in corresponding housing apertures and, on the other hand, their smooth-surface flanks make them suitable to form direct components of the friction pair. Other spring elements, such as coil springs, are likewise conceivable in principle, but suitable friction surfaces should be provided at the free end of the spring elements.

The leaf springs are preferably curved by about 90° between their clamping locations and the friction surfaces. This makes it possible, despite the compact dimensions of the housing, to produce leaf springs which are capable of producing the desired friction forces between the flanks and the friction elements over the displacement range of the actuating element.

In another preferred embodiment of the invention, the actuating element is coupled to a rotary member with a number of lever arms which corresponds to the number of return springs and at the ends of which the friction elements are arranged.

The friction elements arranged at the ends of the lever arms consequently lead to a movement along a circular path when the actuating element is actuated, and, on the one hand, they bend open the leaf springs and simultaneously perform a sliding movement on their flank. The rotary member itself is here of simple construction and can be arranged easily on the bearing shaft of the actuating element.

The angle of rotation of the rotary member is preferably limited between two end positions by stops. This prevents the return springs from being damaged or the friction elements sliding off the friction surfaces if the rotary member is rotated by an excessive amount. In the case of an accelerator pedal, for example, a pivoting angle of about 20° is customary, the pivoting range being limited by the idling position and the full-throttle position (kick-down position if required).

It is furthermore expedient if the friction elements are mounted in an articulated manner on the ends of the lever arms. Since the ends of the lever arms of the rotary member perform a rotary motion relative to the flanks of the leaf springs when the actuating element is actuated, uniform contact is achieved in all angular positions with the friction elements resting flat against the leaf springs. The uniform contact and the resulting uniform wear of the friction elements ensures that the friction elements have a longer life overall than would be the case if the friction elements made only point or line contact with the flanks of the leaf spring.

BRIEF DESCRIPTION OF THE DRAWINGS

An embodiment example of the invention will be explained in greater detail below with reference to the attached drawings, in which.

DETAILED DESCRIPTION OF THE PREFERRED EMBODIMENT

Figure 1:
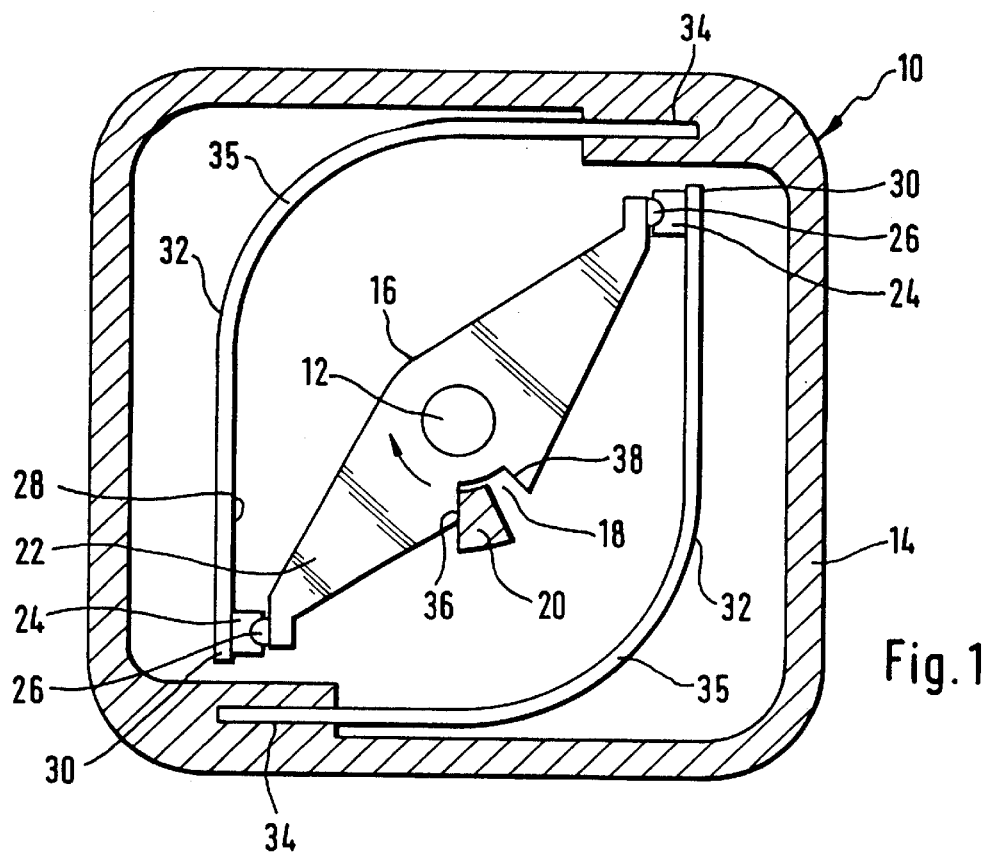
FIG. 1 shows a cross section through a bearing module in a rest position.

FIG. 1 shows a bearing module 10 for a motor-vehicle accelerator pedal (not shown) which can be pivoted about a shaft 12 mounted in a manner not shown in detail in the two side walls of a housing 14.

Arranged in a torsionally rigid manner on the bearing shaft 12 is a rotary member 16, which has a recess 18 into which a stop 20 mounted on the housing projects. The width of the recess 18 is chosen so that the rotary member 16 can pivot through an angle of about 20°, corresponding to the pivoting of the accelerator pedal from the idling position to the full-throttle position.

The rotary member 16 has two lever arms 22, at the end of each of which is arranged a friction element 24. The friction element 24 is fixed to the lever arm 22 by means of a joint 26, allowing it to be pivoted relative to the lever arm 22.

As they pivot, the friction elements 24 slide on side flanks 28 in the region of the free ends 30 of the leaf springs 32, which are clamped at one end at a clamping location 34 fixed in relation to the housing. In their central area, the leaf springs 32 have a curvature 35, allowing them to be accommodated in a space-saving manner in the compact housing 14, despite having a relatively long overall length.

In the idling position of the accelerator pedal, illustrated in FIG. 1, the side flanks 28 of the free ends 30 of the leaf springs 32 rest with a slight preloading force against the friction elements 24. As a result, the leaf springs 32 press one edge 36 of the recess 18 in the rotary member 16 against the stop 20, with the result that the accelerator pedal assumes the idling position.

Figure 2:
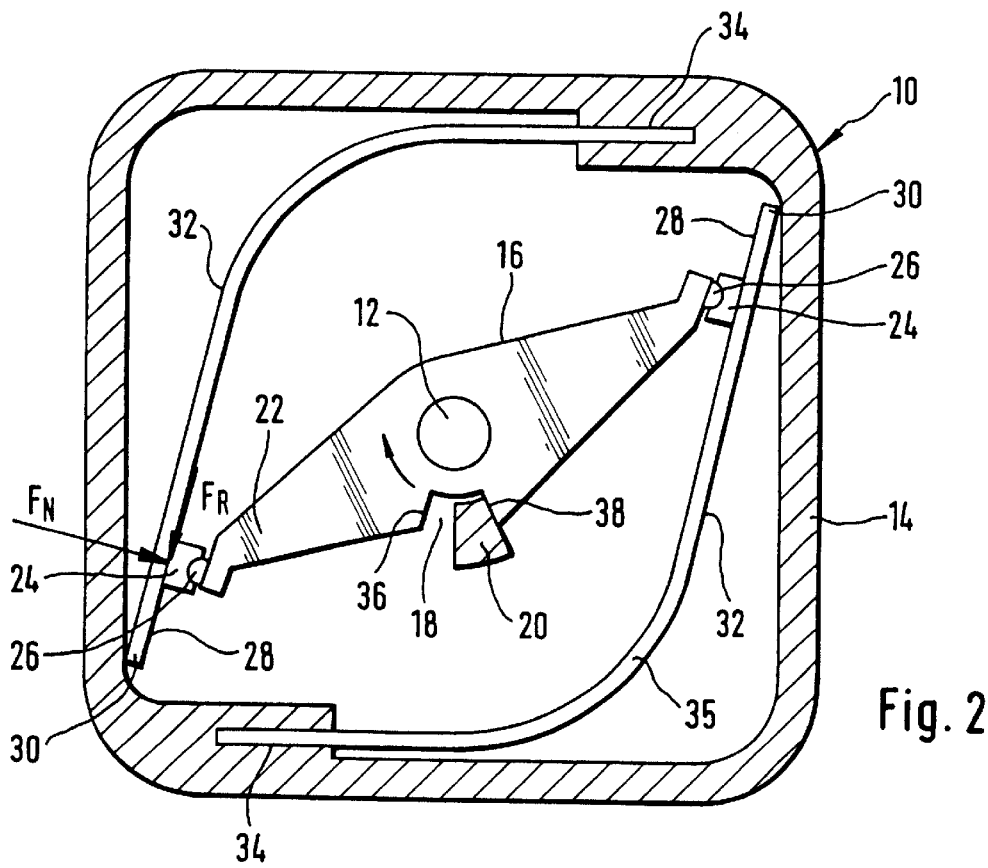
FIG. 2 shows the bearing module in accordance with FIG. 1 in its end position.

If the accelerator pedal is now actuated, the rotary member 16 moves from the idling position illustrated in FIG. 1 into the end position shown in FIG. 2, corresponding to the full-throttle position of the accelerator pedal, in which a second edge 38 of the recess 18 rests against the stop 20. It is not possible to press the accelerator pedal down any further.

As the pivoting member 16 is pivoted, the friction elements 24 describe a circular movement at the ends of the lever arms 22 and, in the process, force the leaf springs 32 apart. At the same time, the friction elements 24 perform a slight pivoting movement about their respective joints 26 since the side flanks 28 of the leaf springs 32 do not follow the circular path of the ends of the lever arms.

The geometry of the leaf spring 32 and of the lever arms 22 is chosen so that the leaf springs 32 and the friction elements 24 cannot jam between the two end positions but that there is always a sufficient excess of force to return the accelerator pedal. For this purpose that component of the normal force between the side flanks 28 and the friction elements 24 which is at a tangent to the bearing shaft 12 must always be sufficiently greater than that component of the friction forces which is also tangential to the bearing shaft 12. The magnitude of the friction forces can be influenced by the choice of friction partners, the lever arm ratios and the characteristics of the springs.

Figure 3:
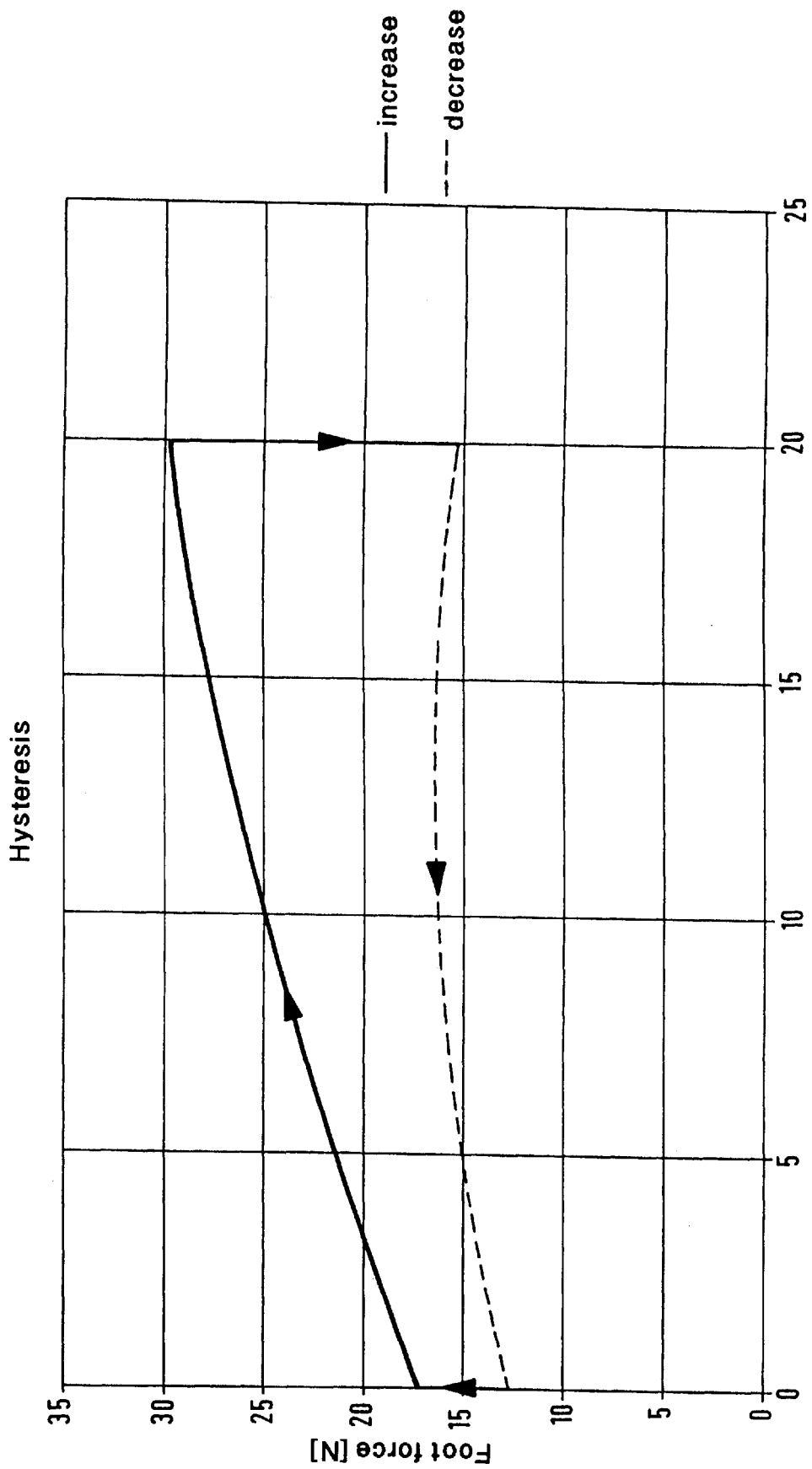
FIG. 3 is a diagram of the force hysteresis during the actuation of an accelerator pedal coupled to a bearing module in accordance with FIG. 1.

The diagram in FIG. 3 shows the foot force required to actuate the accelerator pedal coupled to the bearing module 10 when pressing down (opening up) and releasing (reducing) or holding static. The zero-degrees position here corresponds to the position of the bearing module 10 shown in FIG. 1, while the pedal angle 20° represents the full-load position of the accelerator pedal shown in FIG. 2.

Starting from the idling position shown in FIG. 1, a force of approximately 17 Newtons is initially required to overcome the frictional resistance of the friction elements and the preloading forces of the leaf springs 32. As the accelerator pedal is pressed down further, both the restoring forces and the friction forces increase, with the result that a pedal force of 30 N or slightly less is required to achieve the full-load position illustrated in FIG. 2. A progressive characteristic for the pedal force when opening up the internal combustion engine is thus achieved.

The force required to hold the accelerator pedal in the various positions is indicated by the dashed line. In the full-load position, a holding force of 15 N is thus required, this decreasing after a slight rise in the part-load range to about 17 N, to 13 N in the idling position. The force required is here determined by the difference between the restoring forces produced by the leaf springs 32 and the opposing friction forces. The fact that the holding force of the accelerator pedal in the full-load position is lower than in the part-load range is attributable to the fact that those components of the frictional forces in the region of the full-load position which act tangentially to the bearing shaft 12 rise more sharply than the tangential components of the restoring forces exerted by the leaf springs 32.

As already mentioned, the characteristic can be influenced by the choice of friction partners, the lever-arm ratios and the type and direction of installation of the springs. Thus, for example, it is perfectly conceivable to achieve a degressive spring characteristic if the leaf springs 32 are relieved of load rather than tensioned when the friction elements are pivoted towards the full-load position. The use of other spring elements, such as spiral springs, is also perfectly conceivable.

The bearing module 10 described above can be used for actuating elements of all kinds, including, for example, twist grips on motor cycles or other control levers of machines and systems.

List of reference numerals:
10 Bearing module
12 Shaft
14 Housing
16 Rotary member
18 Recess
20 Stop
22 Lever arms
24 Friction element
26 Joint
28 Side flanks
30 Free end
32 Leaf springs
34 Free end
35 Curvature
36 First edge
38 Second edge

What is claimed is:

1. A bearing module for an actuating element which can be displaced counter to the force of at least two return springs (32) arranged in a redundant manner, a force hysteresis produced by friction occurring when the actuating element is actuated, wherein force is transmitted (12, 16, 22) between the return springs (32) and the actuating element via friction elements (24) each of said friction elements slide on a friction surface (28) assigned to a free end (30) of each of the return springs (32) as the actuating element is displaced, the return springs (32) either being tensioned by the actuating element as a function of the direction of displacement or being returnable by the restoring force of the return springs (32).

2. The bearing module as claimed in claim 1, comprising only two of said return springs (32).

3. The bearing module as claimed in claim 1, wherein the return springs are leaf springs (32) which are clamped at one end and flanks (28) of which form the friction surfaces at their free ends (30).

4. The bearing module as claimed in claim 3, wherein the leaf springs (32) are curved by about 90° between their clamping locations (34) and the friction surfaces (28).

5. The bearing module as claimed in claim 1, wherein the actuating element is coupled to a rotary member (16) with a number of lever arms (22) which corresponds to the number of return springs (32) and at the ends of which the friction elements (24) are arranged.

6. The bearing module as claimed in claim 5, wherein the angle of rotation of the rotary member (16) is limited between two end positions by stops (18, 20, 36, 38).

7. The bearing module as claimed in claim 5 wherein the friction elements (24) are mounted in an articulated manner on the ends (26) of the lever arms.

8. A bearing module for an actuating element, wherein the actuating element is the accelerator pedal of a motor vehicle, which can be displaced counter to the force of at least two return springs (32), arranged in a redundant manner, a force hysteresis produced by friction occurring when the actuating element is actuated, wherein force is transmitted (12, 16, 22) between the return springs (32) and the actuating element via friction elements (24) each of said friction elements slide on a friction surface (28) assigned to a free end (30) of each of the return springs (32) as the actuating element is displaced, the return springs (32) either being tensioned by the actuating element as a function of the direction of displacement or being returnable by the restoring force of the return springs (32).

9. The bearing module as claimed in claim 8, comprising two return springs (32).

10. The bearing module as claimed in claim 8, wherein the return springs are leaf springs (32) which are clamped at one end and flanks (28) of which form the friction surfaces at their free ends (30).

11. The bearing module as claimed in claim 10, wherein the leaf springs (32) are curved by about 90° between their clamping locations (34) and the friction surfaces (28).

12. The bearing module as claimed in claim 8, wherein the actuating element is coupled to a rotary member (16) with a number of lever arms (22) which corresponds to the number of return springs (32) and at the ends of which the friction elements (24) are arranged.

13. The bearing module as claimed in claim 12, wherein the angle of rotation of the rotary member (16) is limited between two end positions by stops (18, 20, 36, 38).

14. The bearing module as claimed in claim 12, wherein the friction elements (24) are mounted in an articulated manner on the ends (26) of the lever arms.

15. The bearing module as claimed in claim 13, wherein the angle of rotation of the rotary member (16) is about 20 degrees corresponding to pivoting of the accelerator pedal from a idling position to a full-throttle position.

* * * * *